United States Patent
Shapiro et al.

(10) Patent No.: US 10,019,168 B2
(45) Date of Patent: Jul. 10, 2018

(54) METHOD AND SYSTEM FOR MULTICASTING DATA TO PERSISTENT MEMORY

(71) Applicant: EMC Corporation, Hopkinton, MA (US)

(72) Inventors: Michael W. Shapiro, San Francisco, CA (US); Mikhail Orel, Sunnyvale, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 7 days.

(21) Appl. No.: 14/788,129

(22) Filed: Jun. 30, 2015

(65) Prior Publication Data

US 2016/0342329 A1     Nov. 24, 2016

Related U.S. Application Data

(60) Provisional application No. 62/163,754, filed on May 19, 2015.

(51) Int. Cl.
| | | |
|---|---|---|
| G06F 9/00 | (2006.01) | |
| G06F 3/06 | (2006.01) | |
| G06F 13/40 | (2006.01) | |
| H04L 12/18 | (2006.01) | |

(52) U.S. Cl.
CPC .............. *G06F 3/061* (2013.01); *G06F 3/065* (2013.01); *G06F 3/0611* (2013.01); *G06F 3/0614* (2013.01); *G06F 3/0655* (2013.01); *G06F 3/0679* (2013.01); *G06F 3/0688* (2013.01); *G06F 13/4022* (2013.01); *H04L 12/18* (2013.01)

(58) Field of Classification Search
CPC .. G06F 3/067; G06F 3/064; G06F 2211/1028; G06F 3/0689; G06F 11/0709; G06F 11/2056; G06F 3/0683; G06F 9/542
See application file for complete search history.

(56) References Cited

U.S. PATENT DOCUMENTS

| | | | | |
|---|---|---|---|---|
| 6,665,780 B1 * | 12/2003 | Bradley | .............. | G06F 11/2058 711/112 |
| 7,415,506 B2 * | 8/2008 | Gajjar | .................. | G06F 3/0605 709/212 |
| 7,603,529 B1 * | 10/2009 | MacHardy | ............ | G06F 3/0608 707/999.202 |
| 7,962,562 B1 | 6/2011 | Budhia et al. | | |

(Continued)

FOREIGN PATENT DOCUMENTS

WO      2013142673 A1     9/2013

OTHER PUBLICATIONS

Extended European Search Report in corresponding European Application No. EP13160486.1 dated Sep. 1, 2016, 7 pages.

*Primary Examiner* — David X Yi
*Assistant Examiner* — Candice Rankin
(74) *Attorney, Agent, or Firm* — Chamberlain Hrdlicka

(57) ABSTRACT

In general, the technology relates to a method and system for writing data to persistent storage. More specifically, embodiments of the technology relate to writing data to vaulted memory segments in persistent storage using pre-defined multicast address groups. Further, embodiments of the technology take into account the current state of the persistent storage in order to select the vaulted memory segments in which to store the data.

20 Claims, 6 Drawing Sheets

(56) References Cited

U.S. PATENT DOCUMENTS

| | | |
|---|---|---|
| 8,301,832 B1 | 10/2012 | Moore et al. |
| 2011/0299317 A1* | 12/2011 | Shaeffer .............. G11C 13/0002 |
| | | 365/106 |
| 2012/0134357 A1* | 5/2012 | Smith et al. .......... H04L 12/462 |
| | | 370/390 |
| 2013/0086320 A1 | 4/2013 | Black et al. |
| 2014/0032697 A1 | 1/2014 | Shapiro et al. |
| 2014/0298137 A1* | 10/2014 | Dhuse ................. G06F 12/1009 |
| | | 714/763 |

* cited by examiner

METHOD AND SYSTEM FOR MULTICASTING DATA TO PERSISTENT MEMORY

CROSS-REFERENCE TO RELATED APPLICATIONS

This application claims priority to U.S. Provisional Patent Application Ser. No. 62/163,754, filed on May 19, 2015. U.S. Provisional Patent Application Ser. No. 62/163,754 is hereby incorporated by reference in its entirety.

BACKGROUND

The speed at which a system can write data to persistent storage and read data from persistent storage is often a critical factor in the overall performance of the system. The traditional approach to transferring data to and from a persistent storage system requires processing by multiple layers of software, firmware, and hardware on both the client system and the persistent storage system. If the storage system wishes to provide increased fault resiliency for client data, multiple copies of the written data are created by the storage system. As a result, extra latency is induced beyond the latency required to write to the underlying storage medium once, in order to achieve increased flexibility.

DETAILED DESCRIPTION

Figure 1:
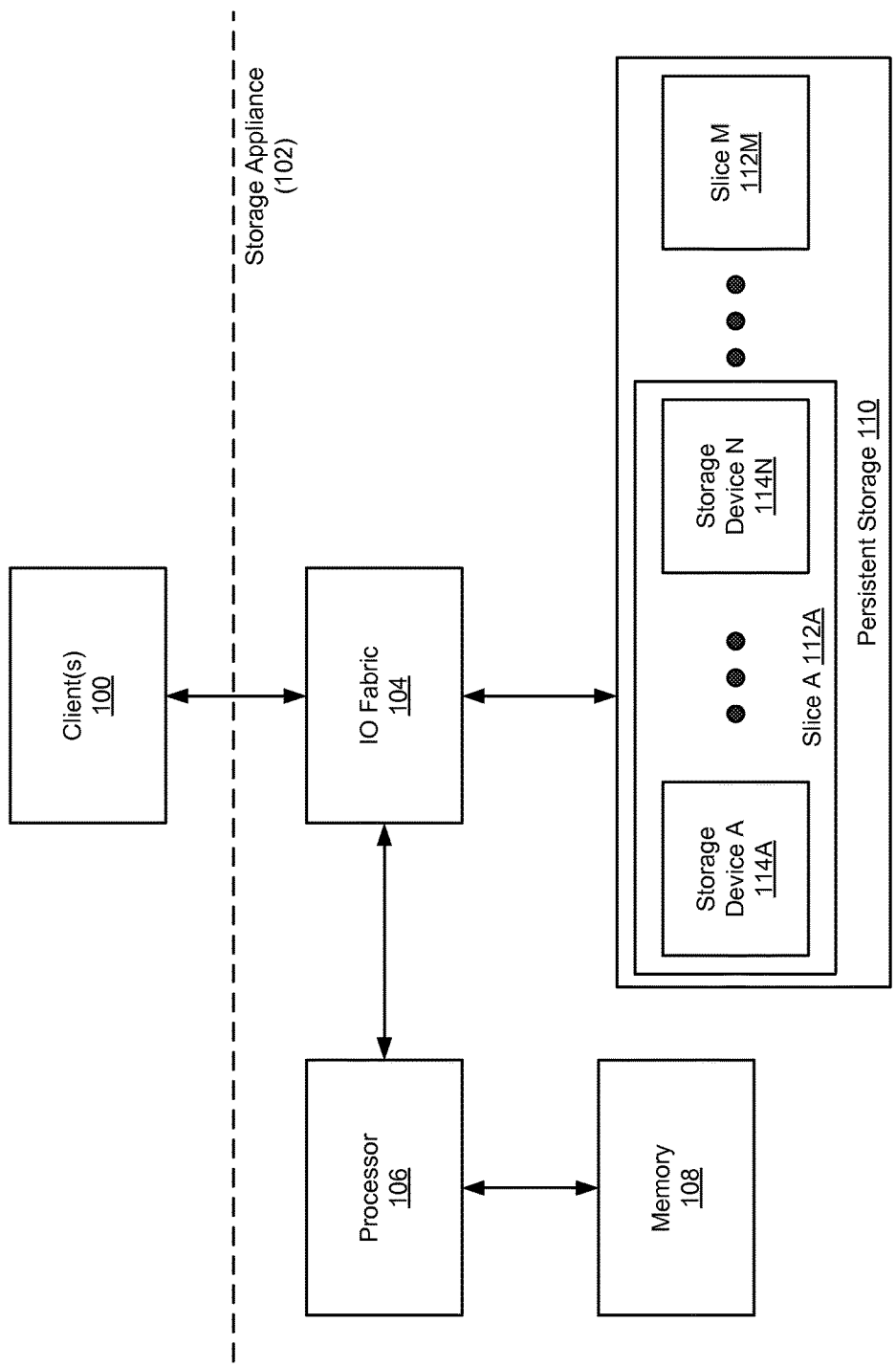
FIG. 1 shows an exemplary system in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology relate to a method and system for writing data to persistent storage with multiple copies for reliability, without sacrificing latency, and adapting to changes in the physical storage configuration. More specifically, embodiments of the technology relate to writing data to persistent memory segments in a set of storage modules using multicasting. Further, embodiments of the technology take into account the current state of the storage modules in order to dynamically select an appropriate multicast configuration.

More specifically, embodiments of the technology relate to creating a set of pre-defined multicast address groups, where each of the pre-defined multicast address groups enables at least two copies of data to be written to the different locations in the persistent storage. The set of pre-defined multicast address groups is created such that at least two copies of the data may be written to the persistent storage even when various storage devices are not present or otherwise available to store data. Further, the selection of a particular pre-defined multicast address group from the set of pre-defined multicast address groups is based on the current state of the persistent storage (i.e., which storage devices are available to store data). In this manner, embodiments of the technology enable a dynamic multicast implementation of the I/O fabric using a set of pre-defined multicast address groups in combination with information about the state of the persistent storage. Said another way, embodiments of the technology use a set of pre-defined multicast address groups in combination with the state of the persistent storage in order to dynamically determine where to write the at least two copies of the data in the persistent storage.

Embodiments of the technology may enable the storage appliance to efficiently store multiple copies of data in response to a write request from a client. The efficiency (or low latency) may be achieved by writing the data to memory locations (instead of directly to solid state storage) using an IO fabric that has been pre-configured with multicast address groups (also referred to as pre-defined multicast address groups). In one embodiment of the technology, the configuration of the individual multicast address groups may not change during the operation of the I/O fabric. Said another way, once a multicast address group is configured and the I/O fabric is servicing requests using the multicast address group, the configuration of the multicast address group cannot be changed unless the I/O fabric suspends the use of the particular multicast address group while it is reconfigured.

FIG. 1 shows an exemplary system in accordance with one or more embodiments of the technology. The system includes one or more clients (100) operatively connected to one or more storage appliances (102). Each of these components is described below.

In one embodiment of the technology, each client (100) is a physical device that includes a processor (or another type of processing component), memory, and a physical interface(s) to enable it to connect to the Input/Output (IO) fabric (104) in the storage appliance. Each of the clients may be connected to IO fabric via a link, i.e., physical connection, between the client and the IO fabric.

Further, each client may include functionality to implement a communication protocol (or portions thereof) in order to implement one or more embodiments of the technology. More specifically, each client may include functionality to send (using the communication protocol) requests and/or data to the storage appliance and/or receive (using the communication protocol) responses and/or data from the storage appliance.

In one embodiment of the technology, the clients (100) are configured to communicate with the storage appliance (102) using one or more of the following communication protocols: Peripheral Component Interconnect (PCI), PCI-Express (PCIe), PCI-eXtended (PCI-X), Non-Volatile Memory Express (NVMe), Non-Volatile Memory Express (NVMe) over a PCI-Express fabric, Non-Volatile Memory Express (NVMe) over an Ethernet fabric, and Non-Volatile Memory Express (NVMe) over an Infiniband fabric. Those skilled in the art will appreciate that the technology is not limited to the aforementioned protocols.

In one embodiment of the technology, the storage appliance (102) includes an IO fabric (104), a processor (106), memory (108), and persistent storage (110). Each of these components is described below.

In one embodiment of the technology, the IO fabric (104) is one or more physical components that provide physical connectivity between the clients and the various components in the storage appliance (102). For example, as shown in FIG. 1, the IO fabric is physically connected to the processor (106) and to the persistent storage (110) (or, more specifically, to storage devices (114A, 114N) located therein).

Figure 3A:
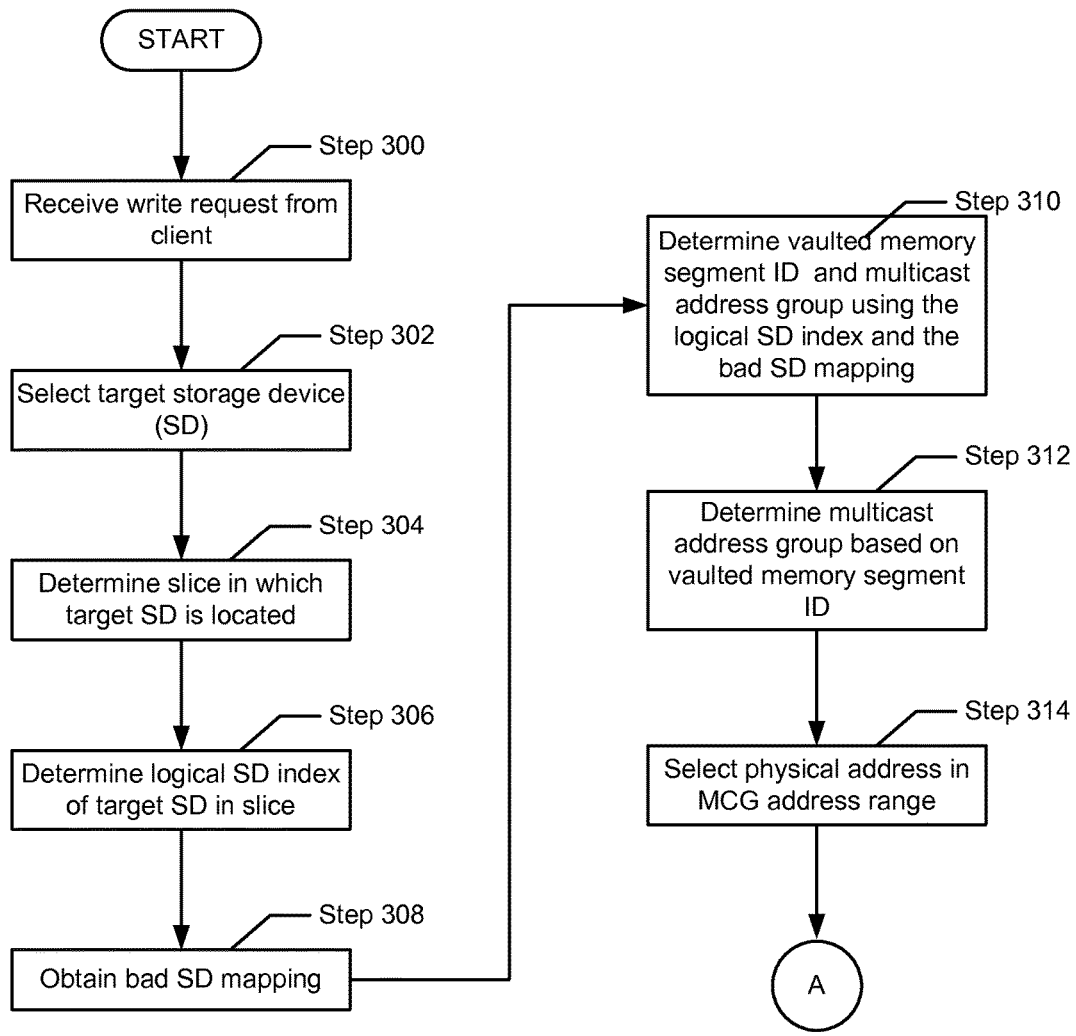
FIGS. 3A-3C show methods for storing data in vaulted memory in accordance with one or more embodiments of the technology.
Figure 3B:
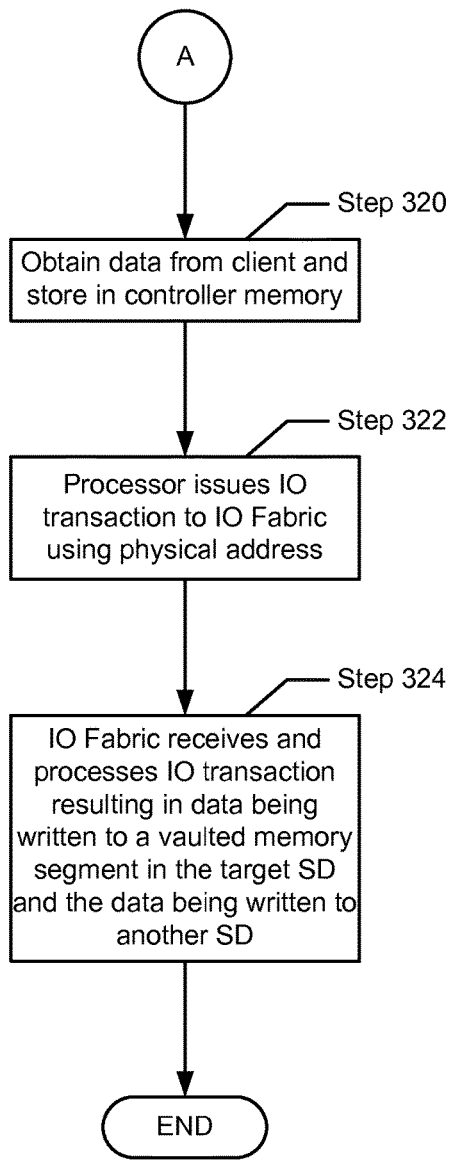
Figure 3C:
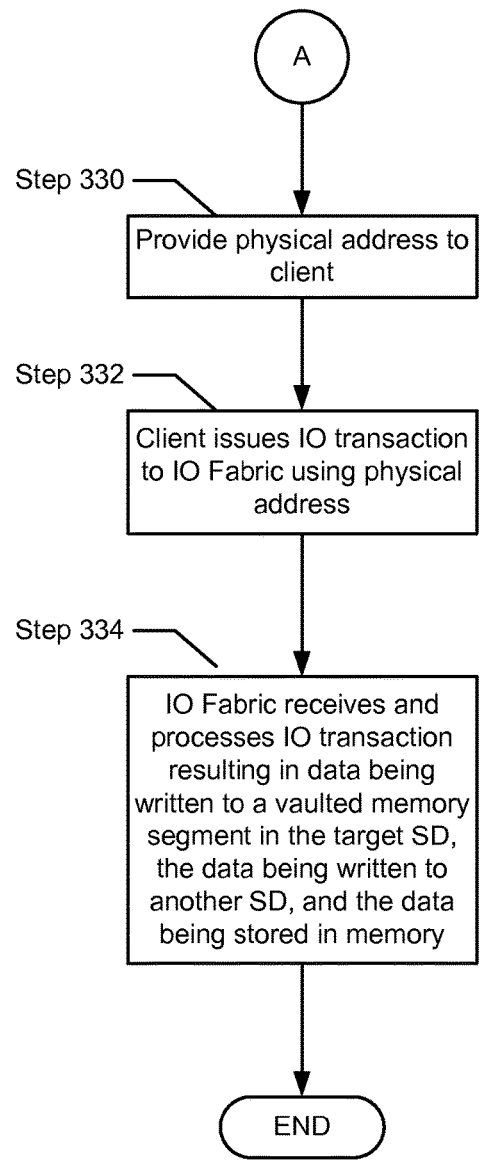

Further, the IO fabric includes functionality to implement multicasting (see e.g., FIGS. 3A-3C). More specifically, in one or more embodiments of the technology, the IO fabric includes functionality to: (i) receive an IO transaction that includes data and a physical address; (ii) determine that the physical address is part of a multicast address group; and (iii) based on the determination made in (ii), perform a multicast write (i.e., initiate the writing of copies of the data to two or more memory locations (described below) within the storage appliance) (see e.g., FIGS. 3B and 3C).

In one embodiment of the technology, the IO fabric is a PCIe fabric such as the PCIe fabric described in U.S. patent application Ser. No. 14/224,846, which is hereby incorporated by reference in its entirety. While the IO fabric may be implemented as a PCIe fabric, the technology may be implemented using an IO fabric that is implemented using other communication protocols and/or that includes a different architecture than the PCIe fabric described in U.S. patent application Ser. No. 14/224,846.

In one embodiment of the technology, the processor (106) is a group of electronic circuits with a single core or multi-cores that are configured to execute instructions. In one embodiment of the technology, the processor may be implemented using a Complex Instruction Set (CISC) Architecture or a Reduced Instruction Set (RISC) Architecture. The processor may include a root complex (as defined by the PCIe protocol). In such cases, the memory (108) may be connected to the processor via the root complex. Alternatively, the memory (108) may be directly connected to the processor using another connection mechanism. In one embodiment of the technology, the memory (108) corresponds to any volatile memory including, but not limited to, Dynamic Random-Access Memory (DRAM), Synchronous DRAM, SDR SDRAM, and DDR SDRAM.

In one embodiment of the technology, the persistent storage (110) includes two or more storage devices (114A, 114N) each configured to store data. The storage devices may be grouped into slices (112A, 112M), where each slice includes at least two storage devices. Further, each storage device may only be associated with a single slice. In one embodiment of the technology, the IO fabric includes one or more switches (not shown), where each switch includes a set of physical ports and functionality to receive requests and/or data on one physical port and to route the request and/or data to one or more other physical ports. In such cases, all storage devices associated with a given slice are connected to the same switch via one port in the set of ports. Said another way, there may be one switch per slice and all storage devices connected to the switch are associated with the same slice. Additional detail about the storage devices is provided below in FIG. 2.

Figure 2:
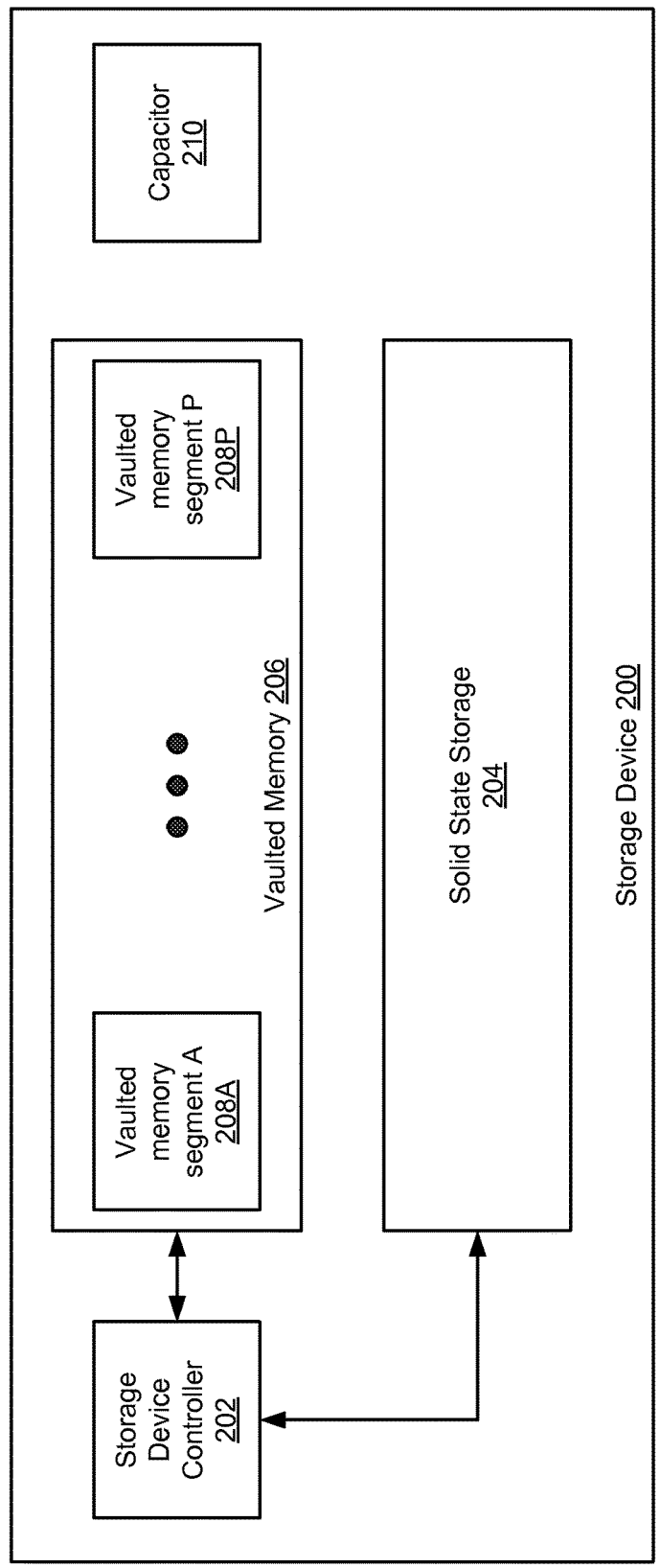
FIG. 2 shows an exemplary storage device in accordance with one or more embodiments of the technology.

FIG. 2 shows an exemplary storage device in accordance with one or more embodiments of the technology. The storage device (200) may include a storage device controller (202), vaulted memory (206), solid state storage (204), and a capacitor (210). Each of these components is described below.

In one embodiment of the technology, the storage device controller (202) is configured to receive requests and/or data from the IO fabric. Further, the storage device controller is configured to receive data into memory that is either persistent, or is persisted by means of vaulting into solid state storage. The storage device controller may also be configured to read data from the persistent memory and/or solid state storage and to provide data to other components in the storage system.

In one embodiment of the technology, the vaulted memory (206) is logically or physically partitioned into two or more vaulted memory segments (208A, 208P), where each vaulted memory segment is associated with a vaulted memory segment ID. The vaulted memory segments are used as part of the write path when data is written to the storage appliance (see FIGS. 3A-3C). In one embodiment of the technology, the storage device controller (202) is configured to write out the entire contents of the vaulted memory (206) to the solid state storage (204) in the event of a notification of a power failure in the storage device (or any other event in which the storage device may lose power). More specifically, the storage device controller is configured to write the entire contents of the vaulted memory to the solid state storage (204) between the time of the notification of the power failure and the actual loss of power to the storage device. In one embodiment of the technology, the capacitor (210) is sized such that it can discharge a sufficient amount of power to the storage device (200) in order for all the data in the vaulted memory to be written to the solid state storage.

In one embodiment of the technology, the solid state storage (204) corresponds to any data storage device that uses solid-state memory to store persistent data. In one embodiment of the technology, solid-state memory may include, but is not limited to, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the technology are not limited to storage class memory.

FIGS. 3A-3C show methods for storing data in vaulted memory in accordance with one or more embodiments of the technology. While the various steps in the flowchart are presented and described sequentially, one of ordinary skill will appreciate that some or all of the steps may be executed in different orders, may be combined or omitted, and some or all of the steps may be executed in parallel.

More specifically, in one or more embodiments of the technology, the storage appliance is configured to store at least two copies of the data in response to a write request from the client. The storage appliance may use multicasting in order to store multiple copies of the data. In such cases, the IO fabric may be pre-configured with one or more multicast address groups and the storage appliance may include functionality to select a physical address within the multicast address group and then use the selected a physical address to store the data in the persistent storage. Turning to FIGS. 3A-3C, FIG. 3A shows a method for determining a physical address to write the data to persistent storage. FIGS. 3B and 3C show various methods for using the aforementioned physical address in order to write the data to the persistent storage.

Turning to FIG. 3A, in step 300 a write request is received from a client by the storage appliance. The write request may include the logical address of the data stored in the client. The write request may also include the data itself. In one embodiment of the technology, the logical address is an address at which the data appears to reside from the perspective of the client. In one embodiment of the technology, the logical address is (or includes) a hash value generated by applying a hash function (e.g., SHA-1, MD-5, etc.) to an n-tuple, where the n-tuple is <object ID, offset>. In such embodiments, the object ID may identify a file and the offset specifies a location relative to the starting address of the file. In another embodiment of the technology, the n-tuple is <object ID, offset, birth time>, where the birth time corresponds to the time when the file (identified using the object ID) was created. Alternatively, the logical address may include a logical object ID and a logical byte address, or a logical object ID and a logical address offset. In another embodiment of the technology, the logical address includes an object ID and an offset. Those skilled in the art will appreciate that the logical address is not limited to the above embodiments.

Continuing with the discussion of FIG. 3A, in step 302, a target storage device (SD) is selected from the set of storage devices that are currently available in the persistent storage. An SD may be deemed to be available when the storage appliance is able to read data from and write data to the SD. Accordingly, while an SD may be physically present in the storage appliance, the SD may not necessarily be available if there is another issue(s) preventing the SD from servicing read requests and write requests. The storage appliance may track which SDs in the storage appliance are available.

In step 304, once the target SD is selected, the slice (see e.g., FIG. 1) in which the target SD is located is identified.

The storage appliance may use an SD-slice mapping to identify the slice in which the target SD resides. For example, the target SD may be SD number 7 (of 36) and, based on the SD-slice mapping, may be located in slice number 1 (of slices 0 to 5).

In step 306, the logical SD index of the target SD within the slice identified in step 304 is determined. For example, if the target SD is SD number 7 and the slice in which the target SD is located includes the following SDs: 5, 7-9, and 14-15, then the logical SD index for the slice is 2 (where the possible logical SD indices are numbered 1-6).

In step 308, the bad SD mapping is obtained. The bad SD mapping may be the bad SD mapping for the slice (i.e., the slice identified in step 304), the bad SD mapping for a set of slices that includes the slice identified in step 304, or the bad SD mapping for all slices in the storage appliance. Regardless of the scope of the bad SD mapping, the bad SD mapping specifies the availability of SDs in at least the slice identified in step 304. For example, if the slice includes SDs: 5, 7-9, and 14-15 and SDs 5 and 8 are unavailable, then the bad SD mapping may be <011011>, where 0 indicates that the SD (referenced by the logical SD index) is not available and 1 indicates that the SD (referenced by the logical SD index) is available. Other representations of the bad SD mapping (i.e., representations that are not bit maps) may be used without departing from the technology.

In step 310, the logical SD index (obtained in step 306) and the bad SD mapping obtained in step 308 are used to determine vaulted memory segment ID. More specifically, in one embodiment of the technology, the bad SD mapping and the logical SD index are used to determine a multicast address group ID (MC GID), where the MC GID is associated with at least one vaulted memory segment ID. Once the MC GID is identified, the logical SD index is used to identify a vaulted memory segment ID that is associated with the MC GID.

The following describes one example of identifying the vaulted memory segment ID in accordance with one or more embodiments of the technology. The example is not intended to limit the technology.

Consider a scenario in which the logical SD index is 2 and the bad SD mapping is <011011>. The vaulted memory segment ID may be determined using the above information and Table 1.

TABLE 1

| | Vaulted Memory Segment ID Selection Table | | | | | |
|---|---|---|---|---|---|---|
| MC GID | Logical Index SD 1 Present? | Logical Index SD 2 Present? | Logical Index SD 3 Present? | Target SD = Logical Index SD 1 | Target SD = Logical Index SD 2 | Target SD = Logical Index SD 3 |
| G0 | 1 | 1 | 0 | V0 | V3 | — |
| G1 | 0 | 1 | 1 | — | V1 | V3 |
| G2 | 1 | 0 | 1 | V3 | — | V2 |
| G3 | 1 | 1 | 1 | V0 | V1 | V2 |
| MC GID | Logical Index SD 4 Present? | Logical Index SD 5 Present? | Logical Index SD 6 Present? | Target SD = Logical Index SD 4 | Target SD = Logical Index SD 5 | Target SD = Logical Index SD 6 |
| G4 | 1 | 1 | 0 | V0 | V3 | — |
| G5 | 0 | 1 | 1 | — | V1 | V3 |
| G6 | 1 | 0 | 1 | V3 | — | V2 |
| G7 | 1 | 1 | 1 | V0 | V1 | V2 |

Continuing with the above example, the logical SD index (i.e., 2) and the bad SD mapping (i.e., <011011>) is used to identify MC GID=G1. More specifically, the logical SD index may first be used to narrow down the MC GIDs from G0-G7 to G0-G3. The bad SD mapping (or at least the first three bits in the bad SD mapping) may then be used to identify G1 from the set of G0-G3. Once G1 has been identified, the logical SD index is used to identify V1 as the vaulted memory segment ID.

In step 312, a multicast address group (which specifies a range of physical addresses) is determined based on the vaulted memory segment ID identified in Step 310. More specifically, in one embodiment of the technology, the combination of the logical SD index and the vaulted memory segment ID is used to identify a multicast address range. In one embodiment of the technology, the multicast address group has been pre-configured within the IO fabric in order to enable the writing of data to the selected vaulted memory segment in the SD associated with the logical SD index and the writing of a copy of the data to another vaulted memory segment in a different SD within the same slice as the SD selected in step 302.

The following describes one example of identifying the multicast address group in accordance with one or more embodiments of the technology. The example is not intended to limit the technology.

Consider a scenario in which the vaulted memory segment ID is V1 and the logical SD index is 2. The multicast address group may be determined using the above information and Table 2. Table 2 provides a mapping between vaulted memory segment IDs and multicast address groups. As part of this mapping, Table 2 shows how data is mirrored within the storage appliance. For example, if V0 is the vaulted memory segment ID, then one copy of data stored in the vaulted memory in the SD identified using logical SD index 1 and a second copy of the data is stored in the vaulted memory in the SD identified using logical index 2.

TABLE 2

Multicast Address Group Selection Table

| Vaulted Memory Segment ID | Logical Index SD 1 or 4 | Logical Index SD 2 or 5 | Logical Index SD 3 or 6 | Multicast Address Group(s) |
|---|---|---|---|---|
| V0 | D | D | — | G0 or G3 (all SDs present) |
| V1 | — | D | D | G1 or G3 (all SDs present) |
| V2 | D | — | D | G2 or G3 (all SDs present) |
| V3 | D | D | — | G0 |
| V3 | — | D | D | G1 |
| V3 | D | — | D | G2 |

Using the above table, the vaulted segment memory ID is used to select one or more rows. If more than one row is identified using the vaulted memory segment ID, then the logical SD index is used to identify the appropriate row in the above table. In the instant example, the vaulted memory segment ID is V1 and, as such, there is only one row that is associated with V1. However, there are two possible multicast address groups associated with V1—namely, G1 and G3. If all SDs are available (as determined using the bad SD mapping), then G3 is selected as the multicast address group. However, if all SDs are not available, then the multicast address group G1 is selected. In the instance example, because all SDs are not available, G1 is selected as the multicast address group.

While Table 2 shows mirroring of data from the client, the technology may be implemented to include the writing of more than two copies of the data to the persistent storage.

Continuing with the discussion of FIG. 3A, in step 314, a physical address within the address range associated with the selected multicast address group is selected.

At this stage, the physical address has been determined. Various methods may then be used to write data to persistent storage using the aforementioned multicast address. FIGS. 3B and 3C show two exemplary methods for using the multicast address. Other methods (aside from the methods shown in FIGS. 3B and 3C) may be implemented to write the data to the persistent storage without departing from the technology.

Turning to FIG. 3B, FIG. 3B describes a scenario in which the data is first stored in the memory (see e.g., FIG. 1, 108) of the storage appliance and then the processor (see e.g., FIG. 1, 106) initiates the writing of the data to the persistent storage. More specifically, in step 320, the storage appliance stores a copy of the data from the client into its memory (see e.g., FIG. 1, 108). Step 320 may occur at any point prior to step 322 (e.g., it may occur in parallel to the steps in FIG. 3A). In another embodiment of the technology, the write request may include the data (see e.g., FIG. 3A, step 300) and, in such cases, step 320 may be performed as part of step 300.

In step 322, the processor issues an IO transaction to the IO fabric, where the IO transaction includes the data that the client specified in its write request (see e.g., FIG. 3A, step 300) and the physical address. The IO transaction may be in any format and include any other content that is required for the IO fabric to process the IO transaction in order for the data to be written to the persistent storage. In one embodiment of the technology, the IO transaction is a PCIe transaction. The technology is not limited to PCIe transactions.

In step 324, the IO fabric receives and processes the IO transaction in order to store one copy of the data in a vaulted memory segment in the target SD and a second copy of the data in a vaulted memory of another SD in the same slice. Processing the IO transaction may include: (i) determining that the physical address in the IO transaction is associated with a multicast address group, and (ii) based on the determination in (i), issuing one IO transaction to a target SD (see FIG. 3A, step 304) and issuing a second IO transaction to another SD (which is determined in FIG. 3A, step 312). After step 324, there may be three copies of the data in the storage appliance—one copy in the memory (108), one copy in the vaulted memory in the target SD, and one copy in the vaulted memory in another SD in the same slice as the target SD.

Turning to FIG. 3C, FIG. 3C describes a scenario in which the client generates the IO transaction using the physical address obtained in Step 314.

In step 330, the storage appliance provides the physical address to the client.

In step 332, the client issues an IO transaction to the IO fabric, where the IO transaction includes the data from the client and the physical address. The IO transaction may be in any format and include any other content that is required for the IO fabric to process the IO transaction in order for the data to be written to the persistent storage. In one embodiment of the technology, the IO transaction is a PCIe transaction. The technology is not limited to PCIe transactions.

In step 334, the IO fabric receives and processes the IO transaction in order to store one copy of the data in the memory, one copy of the data in a vaulted memory segment in the target SD, and one copy of the data in the vaulted memory of another SD in the same slice. Processing the IO transaction may include: (i) determining that the physical address in the IO transaction is associated with a multicast address group, (ii) based on the determination in (i), issuing one IO transaction to a target SD (see FIG. 3A, step 304), issuing a second IO transaction to another SD (which is determined in FIG. 3A, step 312), and issuing a third IO transaction to the processor. After step 324, there may be three copies of the data in the storage appliance—one copy in the memory (108), one copy in the vaulted memory in the target SD, and one copy in the vaulted memory in another SD in the same slice as the target SD.

Regardless of whether FIG. 3B or 3C is implemented to store the data within the persistent storage, at some later point in time, each of the copies of the data in the vaulted memory is stored in the solid state storage of the SD in which the vaulted memory is located.

Figure 4A:
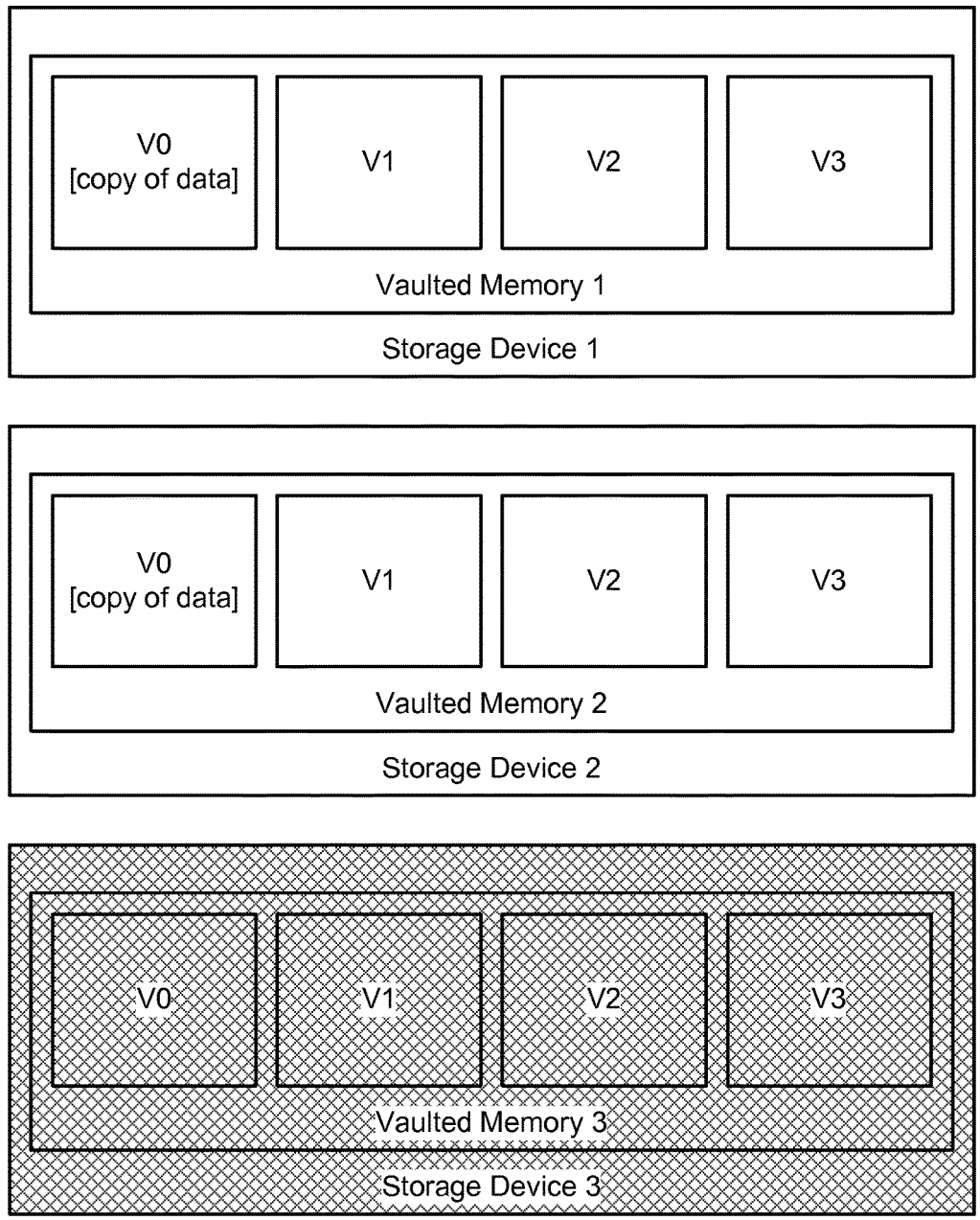
FIGS. 4A-4B show examples in accordance with one or more embodiments of the technology.
Figure 4B:
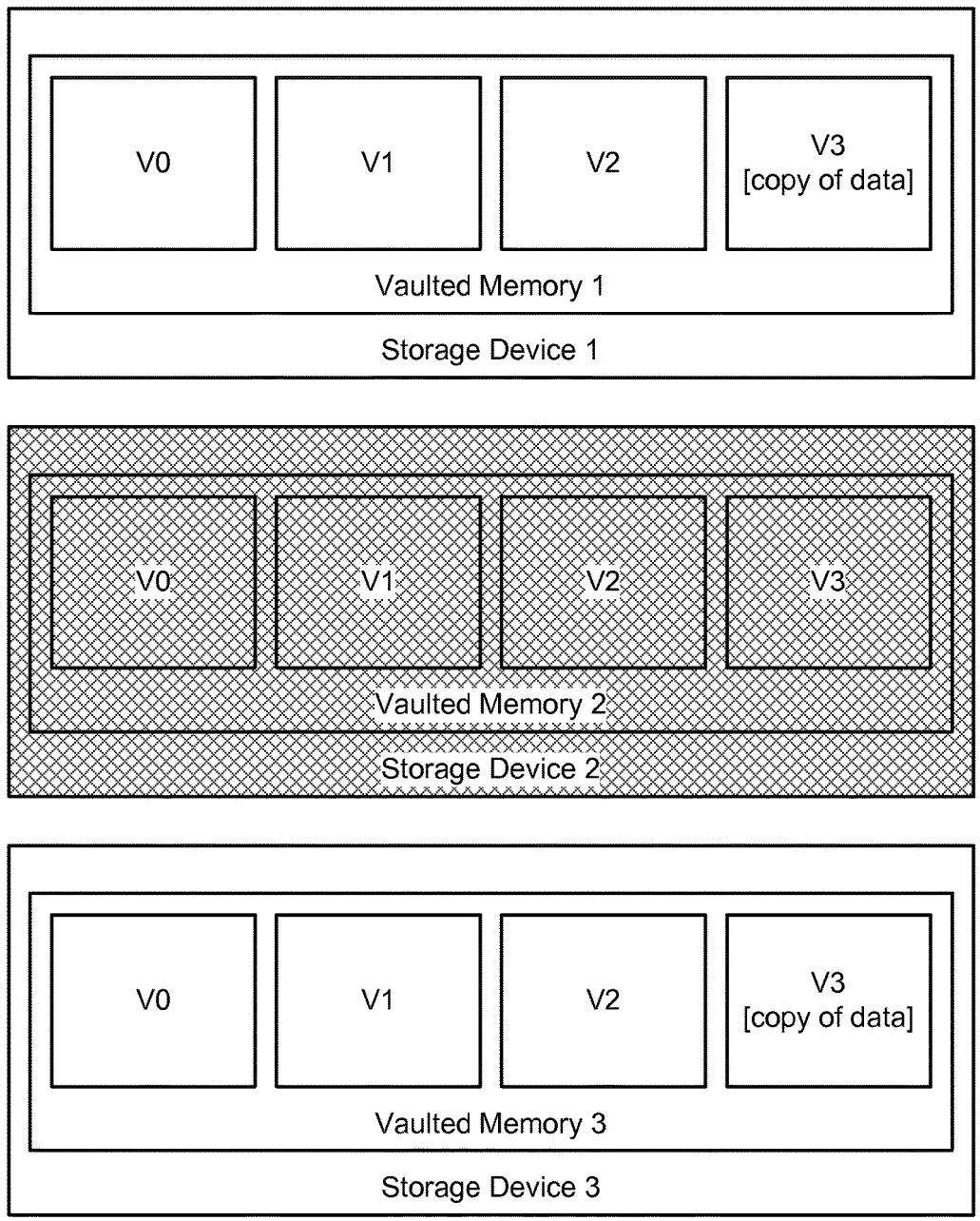

FIGS. 4A-4B show examples in accordance with one or more embodiments of the technology. The technology is not limited to the above example.

Turning to FIG. 4A, consider a scenario in which the storage appliance includes multiple slices where slice 1 includes SD 1, SD 2 and SD 3 (see FIG. 4A). Further, the logical SD indices of the aforementioned SDs in slice 1 are 1, 2, and 3, respectively.

In this example, assume that the client sends a write request to the storage appliance. In response to the request, the storage appliance selects SD 1 as the target SD. Based on this information, the logical SD index for SD 1 is 1. The storage appliance subsequently obtains the following bad SD mapping for slice 1: <110>. The logical SD index and the bad SD mapping are used to identify the G0 as the MC GID using Table 1 (above). The MC GID along with the logical SD index and Table 1 are used to identify V0 as the vaulted memory segment ID.

The vaulted memory segment ID (V0) along with the bad SD mapping and Table 2 is used to identify G1 as the multicast address group. As shown in Table 2, the use of G1 (or, more specifically, a physical address within G1) will result in a copy of the data being stored in a vaulted memory segment that is associated with the vaulted memory segment ID V0 in SD 1 and another copy of the data being stored in a vaulted memory segment that is associated with the vaulted memory segment ID V0 in SD 2. (See FIG. 4A).

Turning to FIG. 4B, consider a scenario in which the storage appliance includes multiple slices where slice 1 includes SD 1, SD 2 and SD 3 (see FIG. 4B). Further, the logical SD indices of the aforementioned SDs in slice 1 are 1, 2, and 3, respectively.

In this example, assume that the client sends a write request to the storage appliance. In response to the request, the storage appliance selects SD 1 as the target SD. Based on this information, the logical SD index for SD 1 is 1. The storage appliance subsequently obtains the following bad SD mapping for slice 1: <101>. The logical SD index and the bad SD mapping are used to identify the G2 as the MC GID using Table 1 (above). The MC GID along with the logical SD index and Table 1 are used to identify V3 as the vaulted memory segment ID.

The vaulted memory segment ID (V3) along with the bad SD mapping and Table 2 is used to identify G2 as the multicast address group. As shown in Table 2, the use of G2 (or, more specifically, a physical address within G2) will result in a copy of the data being stored in a vaulted memory segment that is associated with the vaulted memory segment ID V3 in SD 1 and another copy of the data being stored in a vaulted memory segment that is associated with the vaulted memory segment ID V3 in SD 3. (See FIG. 4B).

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for storing data in persistent storage, comprising:
    selecting a target storage device (SD), wherein the target SD is one of a plurality of SDs in the persistent storage that is currently available to read therefrom and write thereto;
    identifying a slice of the persistent storage in which the target SD resides;
    determining a first logical SD index within the slice for the target SD
    obtaining a bad SD mapping for the slice, where a bad SD mapping comprises a state of each SD of the plurality of SDs;
    selecting, from a set of pre-defined multicast address group identifiers (IDs), a subset of pre-defined multicast address group IDs using the first logical SD index;
    selecting, from the subset of pre-defined multicast address group IDs, a pre-defined multicast address group ID using a portion of the bad SD mapping that corresponds to the subset of pre-defined multicast address group IDs;
    identifying, using the first logical SD index, a vaulted memory segment ID of at least one vaulted memory segment ID associated with the multicast address group ID;
    determining a pre-defined multicast address group based on the vaulted memory segment ID;
    identifying a second logical SD index associated with the pre-defined multicast address group;
    writing the data to a first vaulted memory segment corresponding to the vaulted memory segment ID, wherein the first vaulted memory segment resides in the target SD; and
    writing a copy of the data to a second vaulted memory segment corresponding to the vaulted memory segment ID, wherein the second vaulted memory segment resides in a second SD, wherein the second logical SD index within the slice pertains to the second SD.

2. The method of claim 1, further comprising:
    configuring an Input/Output (IO) fabric with the pre-defined multicast address group prior to determining the pre-defined multicast address group,
    wherein writing the data to the first vaulted memory segment in the target SD and the copy of the data to the second vaulted memory segment in the second SD comprises using the IO fabric to issue a first IO transaction to the target SD and issue a second IO transaction to the second SD.

3. The method of claim 2, wherein the first IO transaction comprises the data and a physical address, wherein the second IO transaction comprises the copy of the data and the physical address, and wherein the physical address is selected from an address range associated with the pre-defined multicast address group.

4. The method of claim 1,
wherein the persistent storage comprises a second plurality of SDs, wherein the second plurality of SDs comprises the target SD and the second SD, wherein the plurality of SDs comprises the plurality of SDs.

5. The method of claim 1, wherein the target SD comprises vaulted memory comprising a plurality of vaulted memory segments, wherein the plurality of vaulted memory segments comprises the first vaulted memory segment.

6. The method of claim 5,
wherein the target SD further comprises solid state storage,
wherein the method further comprises: copying the data in the first vaulted memory segment into the solid state storage.

7. A storage appliance, comprising:
a processor and a memory;
persistent storage comprising:
a first storage device (SD) currently available to read therefrom and write thereto, wherein the first SD comprises a first vaulted memory segment and a first solid state storage;
a second SD currently available to read therefrom and write thereto, wherein the second SD comprises a second vaulted memory segment and a second solid state storage; and
an Input/Output (IO) fabric interposed between the processor and the persistent storage;
wherein the storage appliance is programmed to:
identify a slice of the persistent storage in which the first SD and the second SD reside;
determine a first logical SD index within the slice for the first SD;
obtain a bad SD mapping for the slice, wherein a bad SD mapping comprises a state of each SD of the plurality of SDs;
select, from a set of pre-defined multicast address group identifiers (IDs), a subset of pre-defined multicast address group IDs using the first logical SD index;
select, from the subset of pre-defined multicast address group IDs, a pre-defined multicast address group ID using a portion of the bad SD mapping that corresponds to the subset of pre-defined multicast address group IDs;
identify, using the first logical SD index, a vaulted memory segment ID of at least one vaulted memory segment ID associated with the multicast address group ID;
determine a pre-defined multicast address group based on the vaulted memory segment ID;
identify a second logical SD index associated with the pre-defined multicast address group;
write the data to the first vaulted memory segment in the first SD, wherein the first vaulted memory segment corresponds to the vaulted memory segment ID; and write a copy of the data to the second vaulted memory segment in the second SD, wherein the second vaulted memory segment corresponds to the vaulted memory segment ID, wherein the second logical SD index within the slice pertains to the second SD.

8. The storage appliance of claim 7, wherein the storage appliance is further programmed to:
configure the IO fabric with the pre-defined multicast address group prior to determining the pre-defined multicast address group,
wherein writing the data to the first vaulted memory segment in the first SD and the copy of the data to the second vaulted memory segment in the second SD comprises using the IO fabric to issue a first IO transaction to the first SD and issue a second IO transaction to the second SD.

9. The storage appliance of claim 8, wherein the first IO transaction comprises the data and a physical address, wherein the second IO transaction comprises the copy of the data and the physical address, and wherein the physical address is selected from an address range associated with the pre-defined multicast address group.

10. The storage appliance of claim 7,
wherein the persistent storage further comprises a plurality of SDs, wherein the plurality of SDs comprises the first SD and the second SD.

11. The storage appliance of claim 7, wherein the first SD comprises vaulted memory comprising a plurality of vaulted memory segments, wherein the the plurality of vaulted memory segments comprises the first vaulted memory segment.

12. The storage appliance of claim 11,
wherein the storage appliance is further programmed to: copy the data in the first vaulted memory segment into the first solid state storage.

13. The storage appliance of claim 7, wherein the IO fabric is implemented using Peripheral Component Interconnect Express (PCIe).

14. The storage appliance of claim 7, wherein the first solid state storage and the second solid state storage are NAND flash.

15. A non-transitory computer readable medium (CRM) comprising computer readable program code, which when executed by a computer processor, enables the computer processor to:
select a target storage device (SD), wherein the target SD is one of a plurality of SDs in a persistent storage that is currently available to read therefrom and write thereto;
identify a slice of the persistent storage in which the target SD resides;
determine a first logical SD index within the slice for the target SD;
obtain a bad SD mapping for the slice, wherein a bad SD mapping comprises a state of each SD of the plurality of SDs;
select, from a set of pre-defined multicast address group identifiers (IDs), a subset of pre-defined multicast address group IDs using the first logical SD index;
select, from the subset of pre-defined multicast address group IDs, a pre-defined multicast address group ID using a portion of the bad SD mapping that corresponds to the subset of pre-defined multicast address group IDs;

identify, using the first logical SD index, a vaulted memory segment ID of at least one vaulted memory segment ID associated with the multicast address group ID;

determine a pre-defined multicast address group based on the vaulted memory segment ID;

identify a second logical SD index associated with the pre-defined multicast address group;

write the data to a first vaulted memory segment corresponding to the vaulted memory segment ID, wherein the first vaulted memory segment resides in the target SD; and write a copy of the data to a second vaulted memory segment corresponding to the vaulted memory segment ID, wherein the second vaulted memory segment resides in a second SD, wherein the second logical SD index within the slice pertains to the second SD.

16. The non-transitory CRM of claim 15, further comprising computer readable program code, which when executed by the computer processor, enables the computer processor to:

configure an Input/Output (IO) fabric with the pre-defined multicast address group prior to determining the pre-defined multicast address group, wherein writing the data to the first vaulted memory segment in the target SD and the copy of the data to the second vaulted memory segment in the second SD comprises using the IO fabric to issue a first IO transaction to the target SD and issue a second IO transaction to the second SD.

17. The non-transitory CRM of claim 16, wherein the first IO transaction comprises the data and a physical address, wherein the second IO transaction comprises the copy of the data and the physical address, and wherein the physical address is selected from an address range associated with the pre-defined multicast address group.

18. The non-transitory CRM of claim 15, wherein the persistent storage comprises a second plurality of SDs, wherein the second plurality of SDs comprises the target SD and the second SD, wherein the plurality of SDs comprises the second plurality of SDs.

19. The non-transitory CRM of claim 15, wherein the target SD comprises vaulted memory comprising a plurality of vaulted memory segments, wherein the plurality of vaulted memory segments comprises the first vaulted memory segment.

20. The non-transitory CRM of claim 19, further comprising computer readable program code, which when executed by the computer processor, enables the computer processor to:

copy the data in the first vaulted memory segment into a solid state storage, wherein the target SD further comprises the solid state storage.

* * * * *